Sept. 20, 1971 SHIGERU OKAYAMA ET AL 3,605,601
AUTOMATIC FILM DEVELOPING APPARATUS
Filed Feb. 18, 1969 6 Sheets-Sheet 1
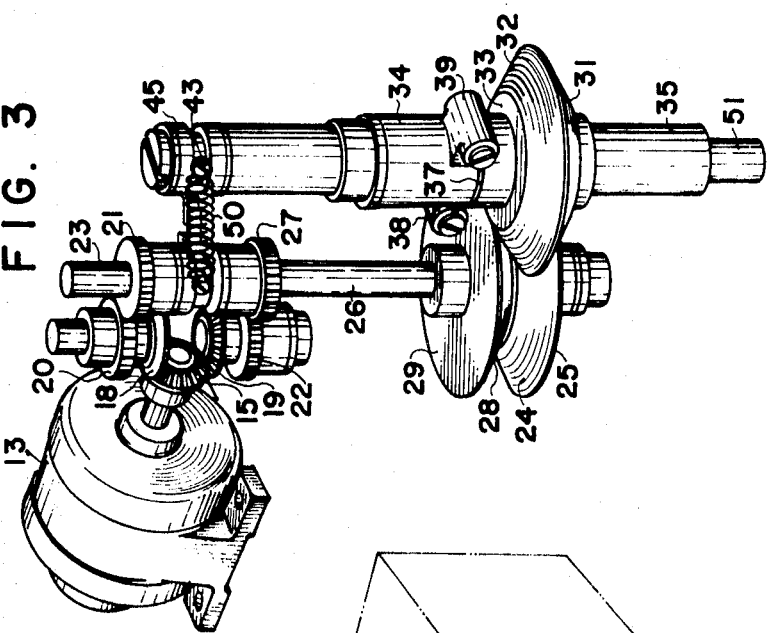
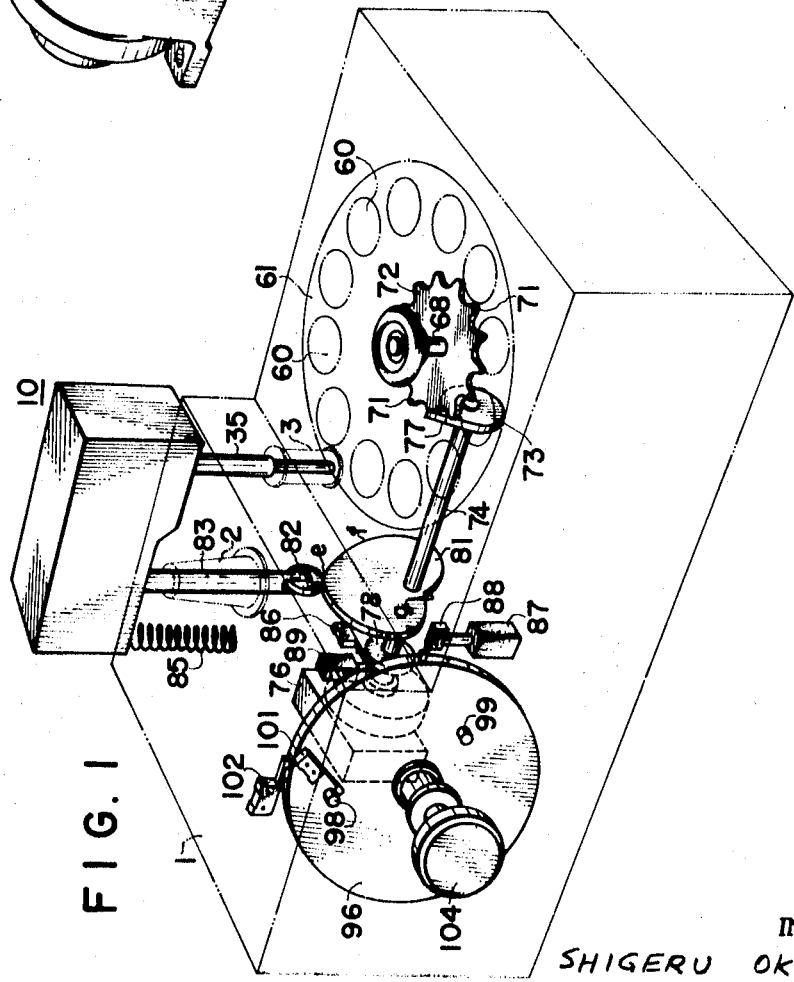
INVENTORS
SHIGERU OKAYAMA
KUNIHIRO OKAYAMA
HIDEHIKO TAKAHASHI
BY Eliot S. Gerber
ATTORNEY

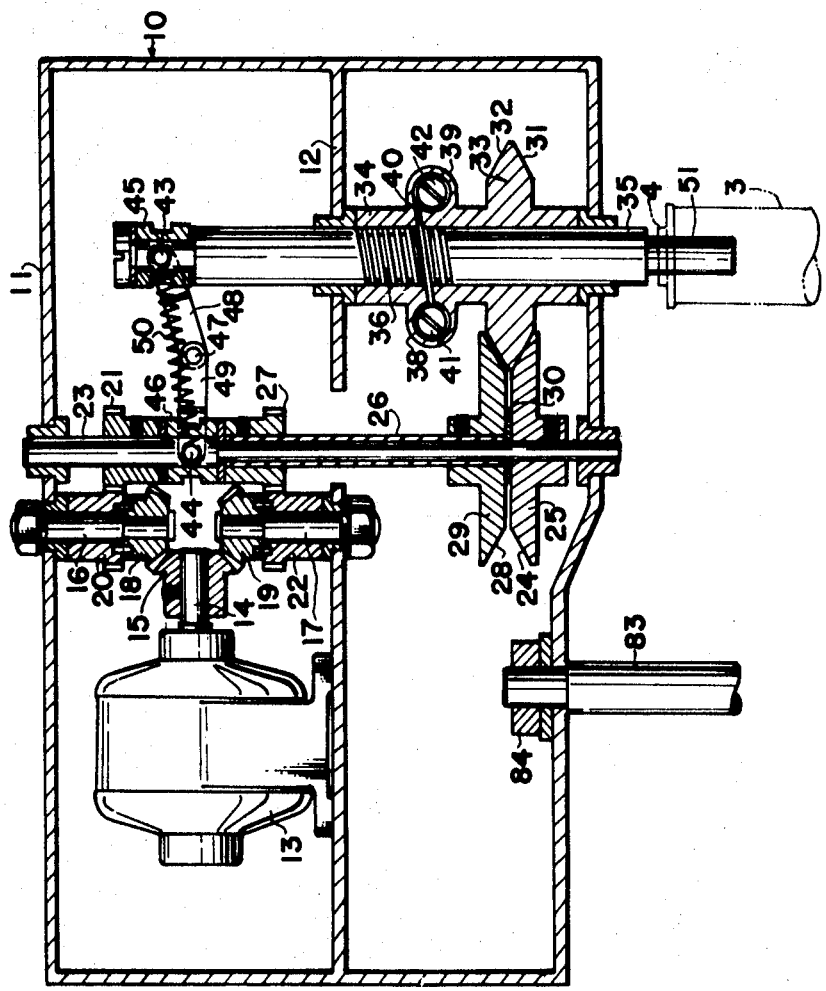

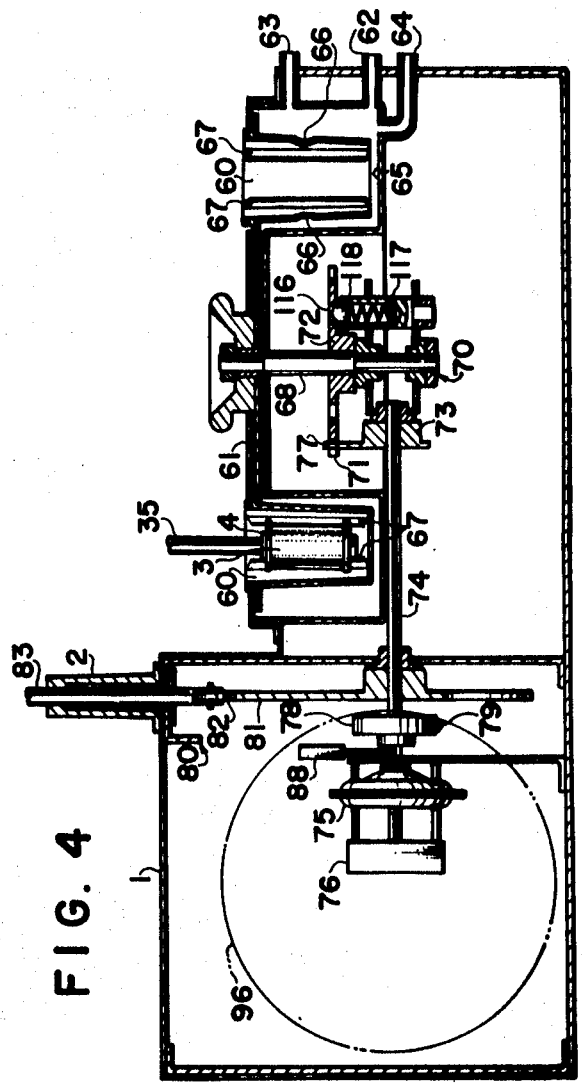

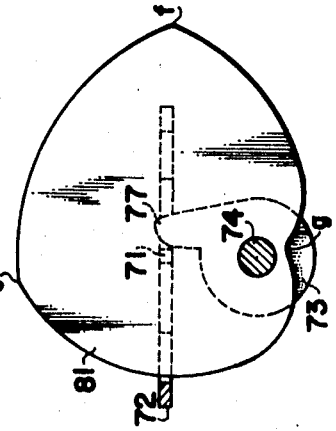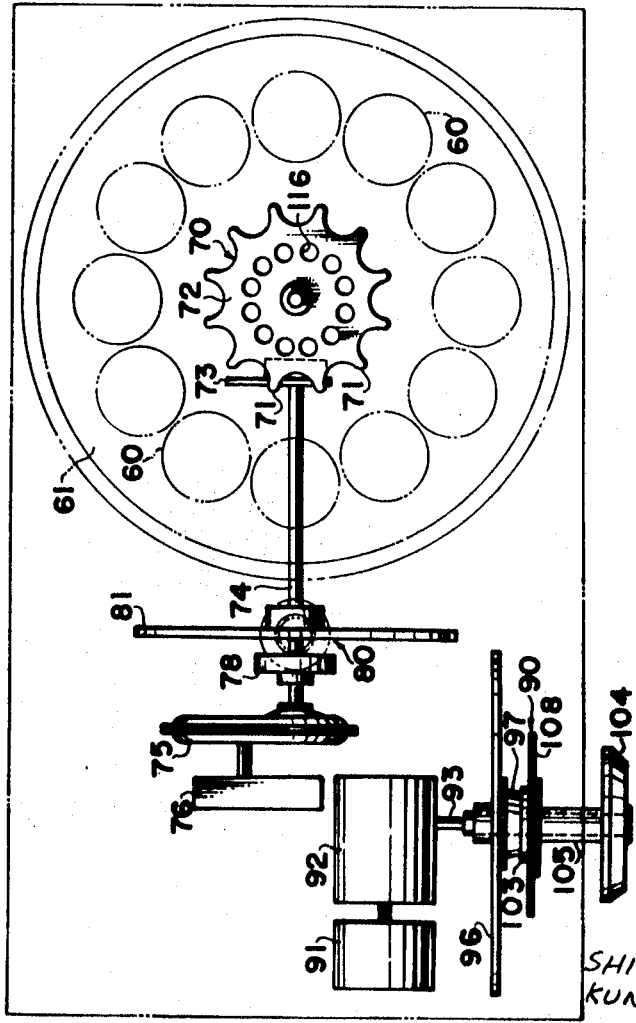

Sept. 20, 1971   SHIGERU OKAYAMA ET AL   3,605,601
AUTOMATIC FILM DEVELOPING APPARATUS
Filed Feb. 18, 1969   6 Sheets-Sheet 5

INVENTORS
SHIGERU OKAYAMA
KUNIHIRO OKAYAMA
HIDEHIKO TAKAHASHI
BY
Elsie S. Gerber
ATTORNEY

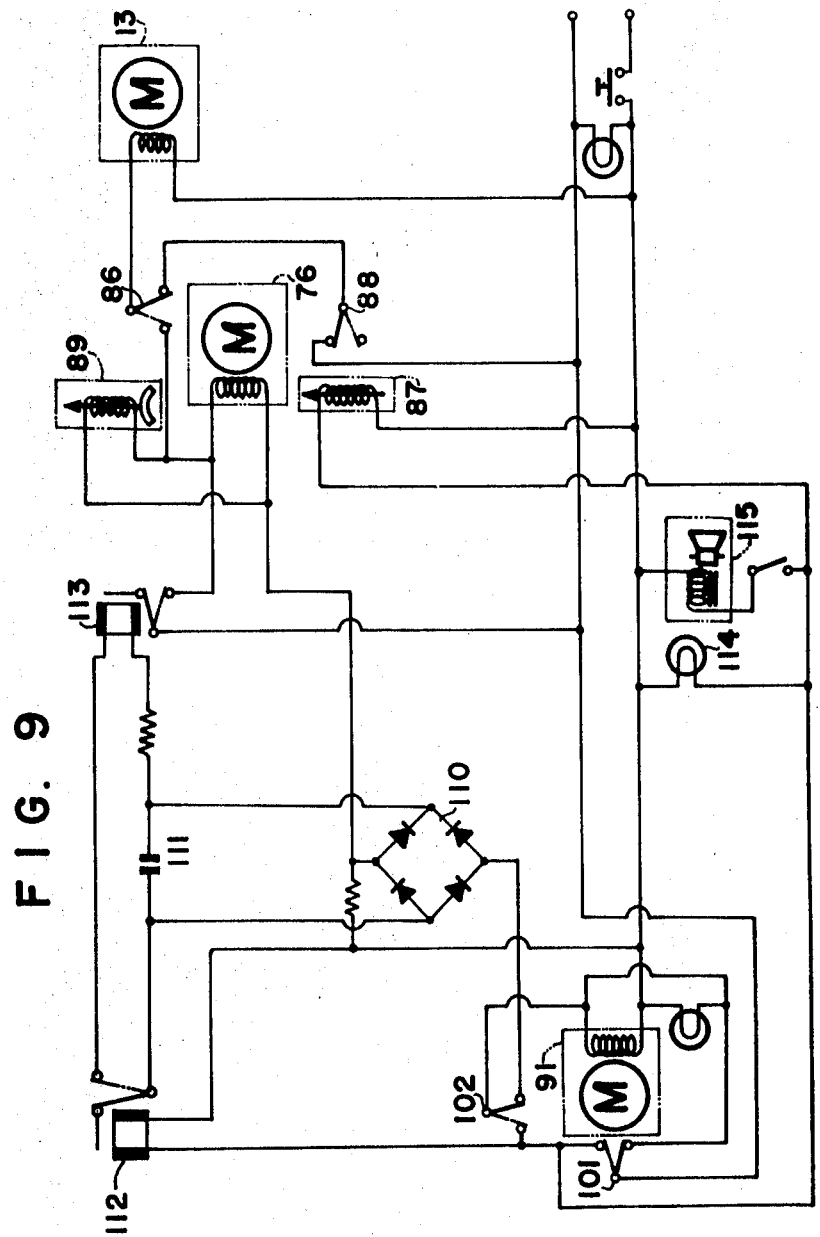

United States Patent Office
3,605,601
Patented Sept. 20, 1971

3,605,601
AUTOMATIC FILM DEVELOPING APPARATUS
Shigeru Okayama and Kunihiro Okayama, both of 4–11 Hanegi 2-chome, Setagaya-ku, and Hidehiko Takahashi, 952 Kita-machi, 3-chome, Kichijoji Musashino-shi, all of Tokyo, Japan
Filed Feb. 18, 1969, Ser. No. 800,232
Claims priority, application Japan, Feb. 27, 1968, 43/12,393; Mar. 6, 1968, 43/14,433
Int. Cl. G03d 3/08
U.S. Cl. 95—89D
7 Claims

ABSTRACT OF THE DISCLOSURE

An apparatus for automatically developing a roll of film within its cassette includes a vertical rotary shaft of a spool rotating device which is fitted to the cassette. Cup-shaped processing tanks, corresponding in number to the developing processing steps, are positioned on a turntable. The tanks contain developer or washing water arranged in the order of the developing steps and each one, in turn, is rotated to beneath the rotary shaft. An ascent and descent device raises and lowers the spool rotary device so that at its bottom dead point the cassette is fully immersed in the developer or washing water of a tank. The spool rotary device includes a rotary direction reversal mechanism whereby the spool is alternately and repeatedly rolled up and back.

---

This invention relates to an apparatus for developing photographic roll film such as monochrome film and color film.

Roll films, which can be loaded into a camera in daylight, i.e., "daylight loading film," are widely used. Nevertheless, a darkroom has always been needed to develop the rolls of film after photographing. It is highly desirable to provide an apparatus wherein the roll film is able to be developed automatically in daylight without the necessity of a darkroom.

An objective of the present invention is to provide a new developing apparatus wherein a roll of film, after being photographed, is developed within its own cassette and without the necessity of a darkroom.

Another objective of the present invention is to provide a developing apparatus wherein, when the development of the roll film is in process, many kinds of developers and washing water may be flowed over along the lengthwise direction of the roll of film but also the solution is stirred to prevent the color from being mottled or spotted.

A further objective of the present invention is to provide a development apparatus wherein the various types of film of different manufacturers may be developed by simple replacement of parts of the apparatus, in accordance with the recommendations of the development processes and processing times proposed by different film manufacturers.

Another objective of the present invention is to provide a developing apparatus wherein the developing processes are automatically made, except a second exposure.

Another objective of the present invention is to provide an economical automatic developing apparatus wherein developers may be replaced after every development process in order to stabilize the developers for obtaining a homogeneous development result.

According to the present invention, a developing apparatus includes a spool rotary device including a vertical rotary shaft to be fitted tightly in the hole of a spool of a cassette. The cassette contains a film which has been photographed. Below the vertical rotary shaft, cup-shaped processing tanks are positioned. There are as many tanks as there are processing steps of the development, the tanks containing developers or washing water therein. Each of these tanks is positioned directly below the rotary shaft in turn by means of a shifting device, i.e., a turntable. The spool rotary device is able to have two positions, top and bottom, by means of an ascent and descent device. At a bottom dead point, the cassette is immersed in the processing tank and an end of the film, bared outside of the cassette, is pinched between the inner surface of the processing tank and the outer surface of the cassette so that the film may be fixed at both ends. At a top dead point, the cassette is raised above the processing tank so that the next processing tank can be shifted directly below the vertical rotary shaft by means of the shifting device.

The spool rotary device according to the present invention includes also means to reverse the rotary direction of the vertical rotary shaft alternately. This means preferably, that it reverses the rotary direction of said shaft alternately by means of a relatively large film resistance force generated when the spool fixing an inner end of the film is to be rolled up or rolled fully back.

After the cassette is immersed in the solution of the processing tank, the roll of film, having its respective ends pinched and fixed, is rolled up and back alternately and repeatedly by driving the spool rotary device. Then, the spaces between surfaces of the film within the cassette are varied, in turn, along the lengthwise direction, so that the solution may effectively flow in and out from the cassette. The solution in the cassette flows into every part of the film with pertinent agitation.

A timer device, cooperating with an electric circuit, controls the processing steps. The timer may make the spool rotary device stop after the predetermined processing period of each processing step; make the ascent and descent device drive after each step; make the shifting device (turn-table) of processing tanks rotate, partially, as much as one pitch at the top dead point of the ascent and descent device; make the descent device stop lowering, at its bottom dead point, and make the spool rotary device rotate again. The timer device also stops all devices at the second exposure step and, if needed, a lamp is lighted and an alarm bell is rung.

In such a manner, within the cassette itself instead of darkroom, the roll film is treated, in each developing process step in turn for a predetermined time according to the recommended steps of the film development process.

Preferably, the processing tanks of a group are arranged around the circumferential portion of a horizontal turn-table. They are spaced with equal pitches with each other and are deposited into an annular temperature-stabilizing tank so that these tanks may be kept to a constant temperature. The constant temperature water is, if desired, used as washing water.

The above and other features of the present invention will be further understood from the following description when read in connection with the accompanying drawings, wherein:

FIG. 1 is a perspective view, with a part exposed, of a developing apparatus according to the present invention;

FIG. 2 is a fragmentary sectional view showing a spool rotary device;

FIG. 3 is a perspective view of the spool rotary device shown in FIG. 2, with the casing removed for clearness;

FIG. 4 is a front sectional view of the developing apparatus shown in FIG. 1;

FIG. 5 is a top plan view, with a part exposed, of the developing apparatus shown in FIG. 1;

FIG. 6 is a view showing a cam for elevating and lowering a spool rotary device and a single-toothed gear meshing with a Geneva gear;

FIG. 9 is a view showing an electric circuit for the apparatus according to the present invention.

Figure 7:
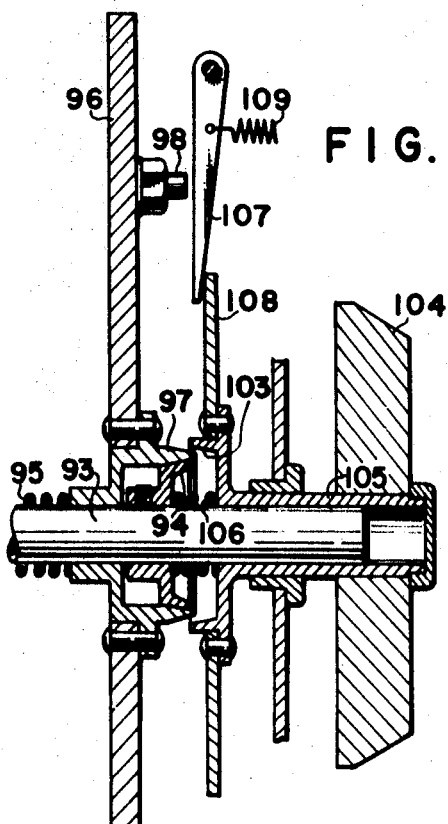
FIG. 7 is an enlarged fragmentary sectional view of a timer device.

A preferred embodiment of the present invention as shown in FIG. 1 comprises, basically, a spool rotary device 10 including means to reverse the rotary direction of a shaft 35 and, provided above a casing 1, a rotary device 70 to rotate processing tanks of a group, an ascent and descent device 80 for the spool rotary device, a timer device 90, and an electric circuit, the last four of them being included in the casing 1.

First of all a spool rotary device 10, clearly shown in FIG. 2 and FIG. 3, shall be described in detail. A bevel gear 15 is fixed to a shaft 14 of a motor 13 mounted to a central partition wall 12 of a square-shaped casing 11. This bevel gear 15 meshes with two bevel gears 18 and 19 rotatably fitted to two fixed vertical shafts 16 and 17, respectively. A spur gear 20, on the side of the bevel gear 18, meshes with a spur gear 21 fixed to a vertical shaft 23 which is rotatable in bearing and causes a rotary body 25, fixed to the lower portion of the vertical shaft 23 and having a conical friction plane 24, to rotate. A spur gear 22 on the side of the bevel gear 19 meshes with a spur gear 27 fixed to a hollow shaft 26 which is rotatably mounted on the vertical shaft 23 and causes a rotary body 29 fixed to the lower portion of the follow shaft 26 and having a conical friction plane 28 to rotate.

Into a space formed between two friction planes 24 and 28 opposing each other through the medium of a washer 30, a flange 33 having two conical-shaped friction planes 31 and 32 is projected. The flange 33 is formed integral with a tubular rotary body 34 which is rotatably fitted to a vertical shaft 35 arranged parallel to the vertical shaft 23. This vertical shaft 35 is provided with a square screw thread 36. The tubular rotary body 34 has a slit 37 therethrough of the same lead angle as the square screw thread 36 and on both ends of the slit 37 are provided with boss parts 38 and 39, respectively.

A piano wire 40 is stretched between boss parts 38 and 39 and fixed by screws 41 and 42, respectively so as to be fitted to the square screw thread 36 of the vertical shaft 35 through the slit 37 of the tubular rotary body 34 so that the piano wire frictionally engages the tubular rotary body with the vertical shaft 35. A bush 45 having a pin 43 is loosely fitted to the upper end portion of the vertical shaft 35 and another bush 46 having a pin 44 is loosely fitted to the vertical shaft 23 between the spur gears 21 and 22 fixed to the vertical shaft 23 and the hollow shaft 26, respectively. A pin 47 is mounted to the casing between two bushes 45 and 46. The pins 43 and 47 and the pins 47 and 44 are connected by means of arms 48 and 49, respectively, and also the pins 43 and 44 are connected by a compressed helical spring 50.

When the frictional surface 24 of the conical rotary body 25 is frictionally engaged with the frictional surface 31 on flange portion 33 of the tubular rotary body 34, the vertical shaft 35 frictionally connected thereto by the piano wire 40 is rotated. Thus, the film in the cassette is rolled up gradually about the spool but as the resistance of the film is increased gradually as it is rolled up, the rotation of the shaft 35 is stopped at last and then the shaft 35 is lowered by means of the piano wire 40 in the square screw thread 36. When the position of the pin 43 comes to below the dynamic production of the straight line between pins 44 and 47, the extended helical spring 50 serves to push down the bush 46. As a result, frictional plane 32 engages with a frictional plane 28 of the rotary body 29 and thereby reversing the rotary direction of the vertical shaft 35.

The lower end portion 51 of the vertical shaft 35 has a diameter just fitted tightly into hole of the spool 4 of the cassette 3.

In an embodiment as shown in FIG. 1, twelve cup-shaped processing tanks 60 are arranged on the circumferential portion of a turn table 61 at the same radius intervals from the center of the turn table 61. Taking a colour film "E-4" of Kodak as an example, they contain in order of Prehaddener, Neutralizer, First development, First stop bath, Washing, Coloured development, Second stop, Bath, Washing, Bleach, Fixing, Washing, and Stabilizer. These processing tanks, as shown in FIG. 4, are deposited into an annular temperature-stabilizing tank 65 including an inlet pipe 62 connected to a constant temperature water adjusting device (not shown), an overflow pipe 63, and an outlet pipe 64. There are two kinds of cup-shaped processing tanks, one is, as shown at left side in FIG. 4, a water-tight tank used for developer and the other is bottomless and has, as shown at right side in FIG. 4, holes 66 on the side surface thereof as it utilizes the constant temperature water as washing water. Each tank has plural vertical ribs 67 projecting on the inner surface thereof so that the cassette inserted from the top is tightly fitted and an end of the film bared outside of the cassette is pinched between the ribs and the cassette. The capacity of each processing tank 60 is about 30 cc.

In FIGS. 4 and 5 a rotary device 70 for processing tanks and ascent and descent device 80 for the spool rotary device 10 are shown. A Geneva gear 72 having the same number of teeth 71 as that of processing tanks is fixed to a vertical shaft 68. A single-tooth gear 73 meshing with the Geneva gear is fixed to a horizontal shaft 74. The shaft 74 is connected to a motor 76 through a reduction device 75. A cam 81 of the ascent and descent device 80 for the spool rotary device 10 is fixed to the shaft 74. A slidable rod 83 having a roller 82 pivoted at the lower end thereof and positioned above the cam 81 is secured through a guide 2 mounted on the casing 1 and the top end of the slidable rod 83 is fixed tightly to the box-shaped casing 11 of the spool rotary device 10 by a nut 84. Reference numeral 85 is a compressed helical spring to help the ascent and descent motion.

A lift of the cam 81 is formed so that the cassette 3 may be immersed into the processing tank 60 at the bottom dead point and may be fixed easily to the end of the shaft 35 at the top dead point.

In FIG. 6 a profile of the cam 81 and a relative position of a tooth 71 of the Geneva gear 72 meshing with a tooth 77 of the single-tooth gear 73 are shown. The tooth 77 of the single-toothed gear 73 is positioned to the same phase as a point e of the top dead points e–f of the cam 81 which are on a circular arc formed by an equal radius, so that, while the spool rotary device 10 is at the top dead points, the Geneva gear 72 is rotated as much as one pitch. In order to hold the geneva gear to the rotated position positively, in an example shown in FIG. 4, a ball 118 is provided to be secured between a compressed spring 117 and a hole 116 made on the Geneva gear as shown in FIG. 5.

On the shaft 74 a disk 78 having a projection 79 at the circumference thereof is also mounted. The projection 79 is located to the same phase as a point g which is the bottom dead point of the cam 81. As shown in FIG. 1, a micro-switch 86 is fixed above the disk 78 and another microswitch 88 is mounted to the plunger of a solenoid 87 fixed below the disk 78. When the solenoid 87 is energized, the micro-switch 88 is moved close to the disk 78 and is driven when the projection 79 cooperates with the micro-switch by rotation of the disk. Another solenoid 89 having a brake shoe is also arranged near the shaft 74 so that the brake shoe may be away from the shaft 74 against the pressure of the spring contained in the solenoid when an electric current is applied and that it may brake the shaft 74 by the pressure of the spring when the electric current is shut off.

Figure 8:
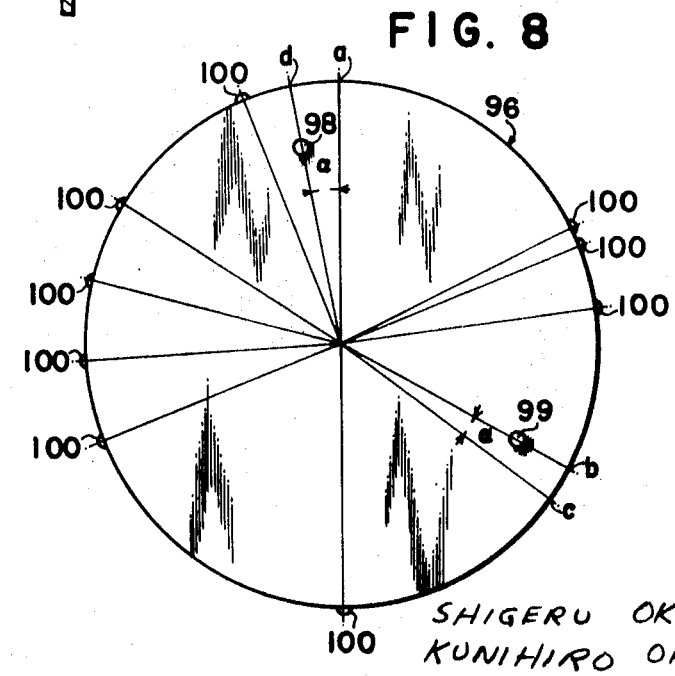
FIG. 8 is a front elevation of an index wheel.

The timer device includes an index wheel 96 as shown in FIG. 8. The side surface of the index wheel 96 is provided with two projections 99 and 98 which serve to stop all processes of this apparatus at the second exposure point and at the end point of the processes, respectively, and the circumference thereof is provided with nine projections 100.

When the developing treatment is to be begun from the first processing step thereof, an end of a movable lever or rod of a micro-switch 102 described hereinafter is, as shown in FIG. 8, on an extension of line a, which is away from a line d passing the center of the index wheel and the projection 98 as much as α at central angle. In the same way, when the developing treatment is to be proceeded after the second exposure, the micro-switch 102 is on an extension of line c, lines c and b corresponding to the lines a and d, respectively.

Central angles formed between straight lines connecting the projections 100 to the center of the index wheel are in proportion to the processing periods of the development in turn, respectively.

The index wheel 96 is loosely mounted to a horizontal shaft 93 as shown in FIG. 7 which is connected to a motor 91 through a reduction device 92. At the center part of the index wheel 96, an annular projecting part 97 to be contacted by pressure of a spring 95 with a drive wheel 94 fixed to the shaft 93 is provided.

At the end portion of the shaft 93, a hollow tube 105 having a friction body 103 capable of engagement with the outer peripheral surface of the projecting annular part 97 of the index wheel 96 and a knob 104 fixed to the outer end of the hollow tube 105 is slidably fitted to the shaft 93 interpositioning a coil spring 106 between the drive wheel 94 and the hollow tube 105.

A micro-switch 101 cooperates with the projections 98 and 99, another micro-switch 102 cooperates with the projections 100 and a stop lever 107 for stopping the index wheel 96 to the start position when it contacts with the projection 98 are mounted to the casing 1. The tip of the stop lever 107 is inclined against the pressure of a spring 109 when it is pushed by a disk 108 fixed to the hollow shaft 105.

The operation of the apparatus according to this invention shall be explained with the help of an electric circuit shown in FIG. 9. Whenever this apparatus stops, the top dead point e–f of the cam 81 looks upwards as made clear hereinafter, so that the spool 4 of the cassette 3 can be fitted to the end 51 of the vertical shaft 35. Next, pressing the knob 104 of the timer device along the shaft 93 against the pressure of the springs 95 and 106, the inner surface of the friction body 103 is engaged with the outer surface of the friction clutch 97 and thereby separating the inner surface of the friction clutch 97 from the clutch 94 having engaged so far. After that, turning the knob 104 as far as the projection 98 provided on the side wall of the index wheel is touched by the stop lever 107. The micro-switch 101 closes (thick line) the drive circuit of the motor 91 so that the shaft 93 begins to rotate. At the same time, the solenoid 87 is turned off electricity so that the micro-switch 88 fixed to the plunger thereof is away from the projection 79 of the disk 78 and switched on (thick line). Then the drive circuit of the motor 76 is closed to rotate the cam 81.

Following the descent of the spool rotating device 10, the cassette 3 goes down into the processing tank to be immersed and, at the bottom dead point, the micro-switch 86 is turned on by a projection 79 on a disk 78 as it rotates so that the drive circuit of the motor 13 is closed and the vertical shaft 35 begins to rotate. At the same time, the drive circuit for motor 76 and the circuit of the solenoid 88 for brake are closed and the shaft 74 is stopped immediately. The time intervals of the shaft stops are about 2 to 3 seconds.

After that, when the pushing pressure for the knob 104 is removed, the rotation of the motor 91 is transferred to the friction clutch 97 through the drive wheel 94 so that the rotation of the index wheel 96 begins. While the projections 100 of the index wheel 96 are not cooperated (thick line) with the micro-switch 102, alternating current 100 v. is rectified by rectification 110 and is kept charging a condenser 111.

When the projections 100 operate (chain line) the micro-switch 102, the circuit charging the condenser is broken and a relay (AC—100 v.) 112 is operated. Discharge of the condenser makes another relay (DC—35 v.) 113 operate (chain line) of a minute (i.e. one to two seconds) so that a drive circuit for the motor 76 is made. At the same time the solenoid 89 for brake is applied electricity to remove the brake-shoe. The motor 76 is rotated as far as a slight angles and after the movable lever or rod of the micro-switch 86 gets over the projection 79 of the disk 78 (from thick line to chain line), the rotation of the motor 76 for the cam is continued even if the discharge of the condenser comes to an end. After rotating once, the rotation of the disk 78 is stopped as the projection thereof is operated (thick line) with the micro-switch 86. At this same time, the solenoid for the brake is stopped electrically so that the shaft 74 is braked.

After a while, when the projection 98 or 99 of the index wheel switches off (thick line) the micro-switch 101 as it is rotated, the drive circuit of the motor 91 is opened and a lamp 114 is lighted up and a buzzer 115 alarms. At the same time, the solenoid 87 being applied electricity, the micro-switch 88 is elevated, so that, when the projection 79 of the disk 78 comes downwards as it is rotated, that is, when the top dead point (e∼f) of the cam faces upward, the drive circuit of the motor 76 for the cam is opened and the brake is applied because the solenoid 88 for braking is stopped electricity.

Although the invention has been described with reference to a preferred embodiment of the present invention, these may be modified in various ways without departing from the scope of the claims.

Further, of course, this apparatus may be adapted for the development of the monochrome film.

What is claimed is:

1. A film developing apparatus comprising, in combination:
   a casing;
   a spool rotary device provided above the casing and including a vertical rotary shaft adapted to be fitted tightly within the hole of a spool of a cassette packing a photographed film;
   a rotary direction reverse device to reverse the rotary direction repeatedly and alternately of said vertical shaft;
   a group of cup-shaped processing tanks, with a tank being provided for each of the steps of the developing process, said tanks containing developer or washing water and at least one of them being removably arranged and aligned with the axis of said vertical rotary shaft;
   a shifting device for said group of processing tanks, said shifting device bringing the processing tanks, one after the other, aligned with the axis of said vertical rotary shaft and with the open mouth of said tanks below said shaft;
   a timer device and an electric circuit which determines the processing period of each processing step;
   an ascent and descent device for the spool rotary device, wherein under control of said timer device at a bottom dead point of said ascent and descent device the cassette fitted to one end of the vertical rotary shaft is immersed in the processing tank located directly below the vertical rotary shaft and an end of the film bared out of the cassette is pinched and fixed between the inner surface of said processing tank and the outer surface of said cassette, at a top dead point thereof said cassettee being elevated to the place where said processing tanks are not prevented from shifting when said shifting device for the processing tanks of a group is operated; and said timer device and circuit controlling the operation of said spool rotary device, said ascent and descent device, and said shifting device for the processing tanks;

wherein at every predetermined processing period of each processing step, each operation including the stopping and elevating of said vertical rotary shaft, the shifting of said processing tanks at the top dead point of the vertical rotary shift and the lowering and re-rotation of said shaft is performed in turn.

2. A film developing apparatus as claimed in claim 1, wherein said rotary direction reverse device comprises sensing means of film resistance force generated when the film in the cassettee is to be rolled up and back fully, rotary direction changing means for said vertical rotary shaft which is operated by said sensing means, and connecting means to connect said sensing means with said changing means.

3. A film developing apparatus as claimed in claim 2 wherein:

said changing means includes two intermediate shafts meshing with each other and rotatable in opposite directions by a gear train connected to a motor and two drive rotary bodies having transmissible friction planes.

4. A film developing apparatus as claimed in claim 1, wherein said ascent and descent device for the spool rotary device includes an ascending and descending cam, at least, the longest curve of profile of said cam being formed of equal radii.

5. A film developing apparatus as claimed in claim 4, wherein said cup-shaped processing tanks of a group are arranged into a temperature-stabilizing tank in the casing and mounted to a rotatable circular turn table, which is fixed by a vertical shaft, at equal pitch and radius from the center thereof and said shifting device for said processing tanks includes a Geneva gear meshing with an end portion of said vertical shaft of the circular turn table and a single-toothed gear fixed to one end of a shaft having said ascending and descending cam fixed thereto.

6. A film developing apparatus as claimed in claim 5, wherein said cup-shaped processing tanks of a group comprise plural cup-shaped water-tight processing tanks having plural vertical ribs projected from the inner surface thereof and plural cup-shaped bottomless processing tanks having plural vertical ribs projected from the inner surface thereof and having plural holes made through the side surface thereof, said projected ribs forming a circular space to fit said cassette tightly therein.

7. A film developing apparatus as claimed in claim 1, wherein:

said timer device includes a circular index wheel and a cam, the outer periphery of said index wheel having plural projections, each of center angles formed by the adjacent projections being in proportion to predetermined processing times, and side surface of said index wheel comprising two projections to stop this apparatus at a second point and at an end point of the processes, respectively, said electric circuit comprises a first electrical-switch making a drive circuit of the index wheel switch on or off in cooperation with the projections on the side surface of said index wheel, a second electrical-switch to change over an electric circuit for charging a condenser through a rectifier and a first drive circuit of the cam to be formed by discharge of said condenser, alternatively, in cooperation with projections on the outer periphery of said index wheel while the drive circuit of the index wheel is closed, a third electrical-switch provided below a rotary disk, which is fixed to the shaft of the cam and has a projection on the outer circumference thereof at the same phase as a bottom dead point of said cam, said third electrical-switch being mounted to a solenoid which makes the position of said third electrical-switch separate from the projection of said disk far enough not to cooperate with the projection thereof while the drive circuit of the index wheel is opened, and on the other hand while the drive circuit of the index wheel is closed, the position of said third electrical-switch being near to the projection of said rotary disk to switch on or off a second drive circuit of the cam in corporation with the projection thereof, and a fourth electrical-switch provided above the rotary disk, said fourth electrical-switch being provided to said drive circuit of the cam to change over said second drive circuit of the cam and a spool drive circuit, alternatively, in cooperation with the projection of said rotary disk.

References Cited
UNITED STATES PATENTS

| | | | |
|---|---|---|---|
| 2,380,378 | 7/1945 | Allen | 95—89X |
| 2,645,236 | 7/1953 | Fisher | 134—61 |
| 3,412,667 | 11/1968 | Hunt | 95—93 |
| 3,443,504 | 5/1969 | Rose et al. | 95—90.5 |

SAMUEL S. MATTHEWS, Primary Examiner

F. L. BRAUN, Assistant Examiner

U.S. Cl. X.R.

95—93